Sept. 13, 1966   M. BAERMANN   3,272,956
MAGNETIC HEATING AND SUPPORTING DEVICE FOR
MOVING ELONGATED METAL ARTICLES
Filed March 26, 1964   5 Sheets-Sheet 1
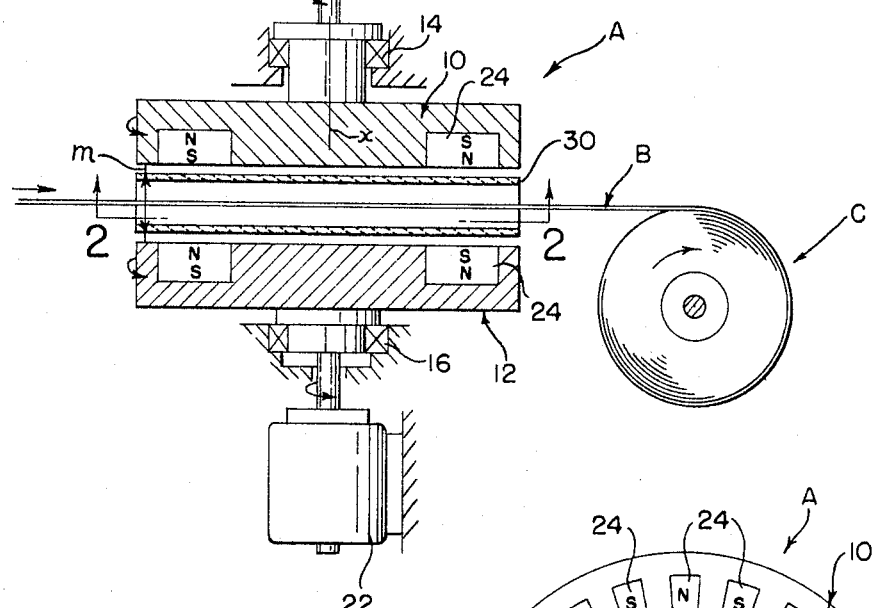
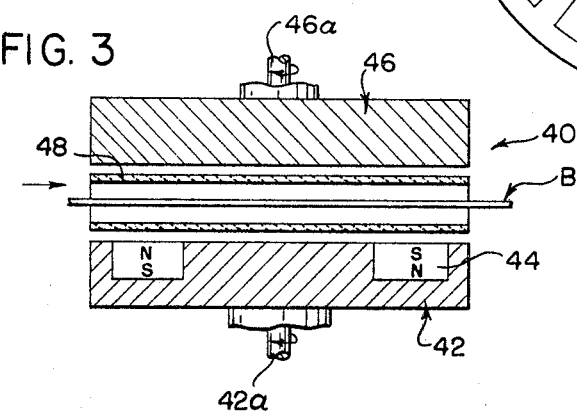
INVENTOR.
MAX BAERMANN
BY
Tillewry & Body
ATTORNEYS

INVENTOR.
MAX BAERMANN

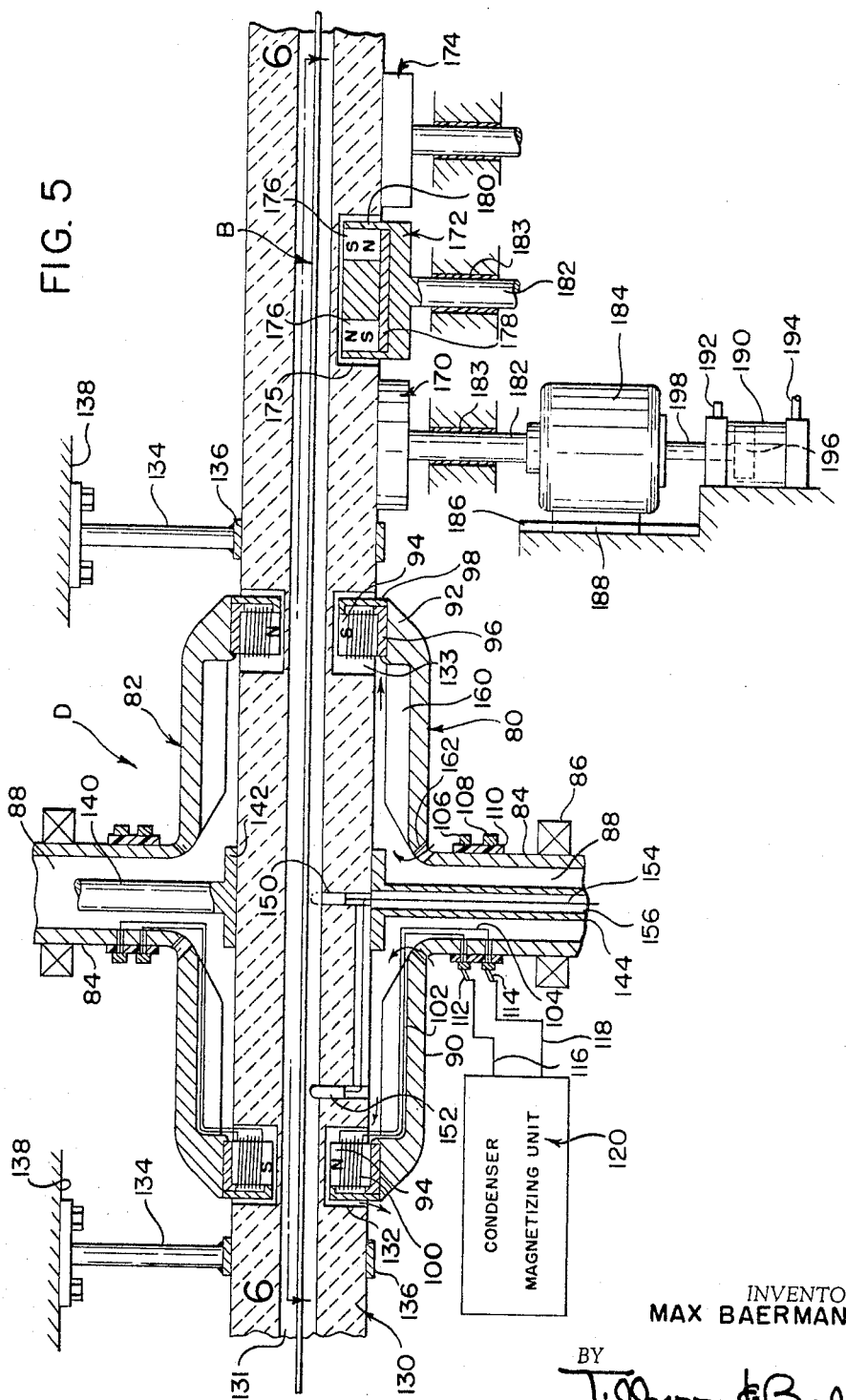

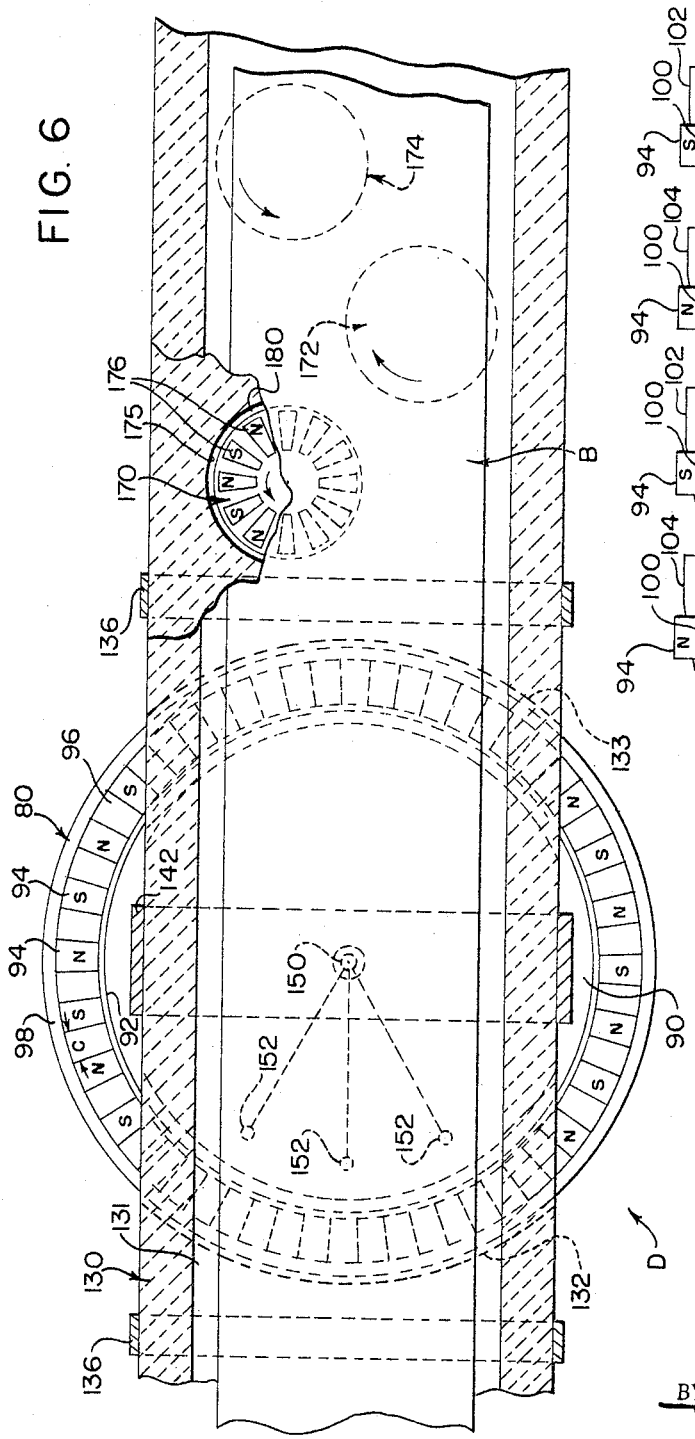

Sept. 13, 1966  M. BAERMANN  3,272,956
MAGNETIC HEATING AND SUPPORTING DEVICE FOR
MOVING ELONGATED METAL ARTICLES
Filed March 26, 1964  5 Sheets-Sheet 5
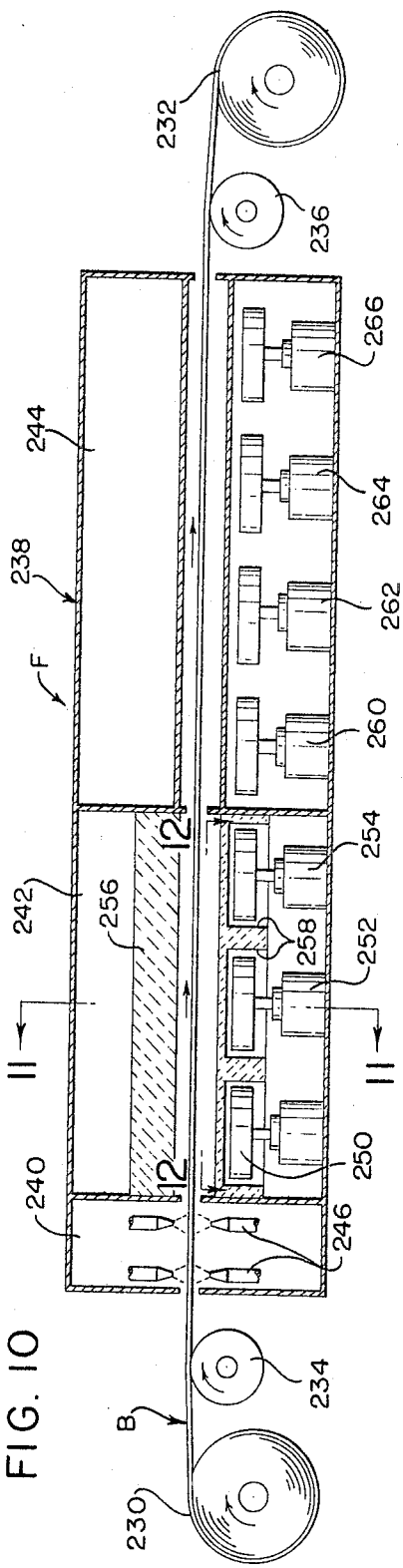
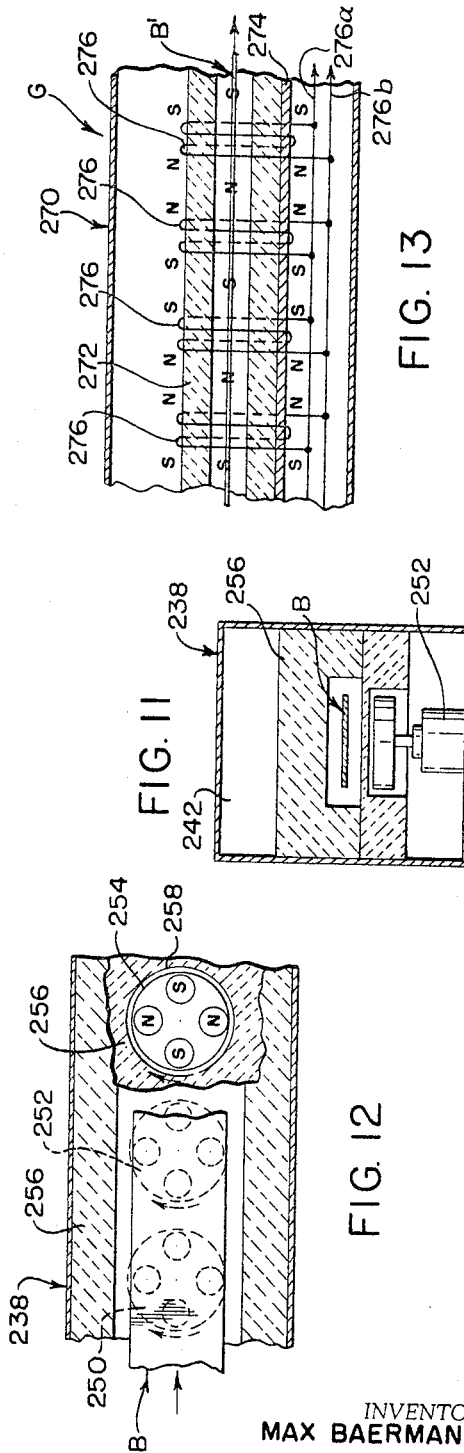
INVENTOR.
MAX BAERMANN
BY Tillery & Body
ATTORNEYS 3,272,956
MAGNETIC HEATING AND SUPPORTING DEVICE
FOR MOVING ELONGATED METAL ARTICLES
Max Baermann, Bensberg Wulfshof,
Cologne (Rhine), Germany
Filed Mar. 26, 1964, Ser. No. 354,861
Claims priority, application Germany, Apr. 1, 1963,
B 71,367
24 Claims. (Cl. 219—10.61)

The present invention is directed to the art of heating and supporting articles and more particularly to a device for heating and/or supporting continuously moving elongated articles, such as metal strips or pipes.

The present invention is a continuation-in-part application of my copending applications Serial No. 168,616, filed January 25, 1962, now abandoned, and Serial No. 274,894, filed April 4, 1963, now United States Letters Patent No. 3,187,151, which was in turn a continuation-in-part application of my application Serial No. 841,869, filed September 23, 1959, now United States Letters Patent No. 3,085,142, which was in turn, a continuation-in-part application of my earlier filed application Serial No. 637,-491, filed January 31, 1957, now United States Letters Patent No. 2,912,552.

The present invention is particularly applicable to heating and/or supporting continuously moving elongated articles, such as metal strips, and it will be described with particular reference thereto; however, it is to be appreciated that the present invention has much broader applications and may be used for heating and/or supporting other moving articles, such as metal pipes.

The term "elongated article" as used herein refers to a strip, wire, pipe, or similar article; however, for the purposes of simplicity, the term "strip" will be hereinafter used because the present invention is particularly applicable to the heating and/or supporting of a moving metal strip as it is being processed.

my copending application Serial No. 168,616 relates to an eddy current heating device adapted to heat a substance, such as food, in a thin metal container. This device includes an electrically non-conductive, non-magnetic means for supporting the container and mechanical means for passing, in rapid succession, a plurality of magnetic fields substantially perpendicularly through the container with successive fields having opposite direction and substantially equal magnitude. The magnetic means as disclosed in this copending application includes a pair of spaced magnetic rotors adapted to rotate about an axis and each rotor has a plurality of circumferentially spaced, alternate north and south magnetic poles, each north magnetic pole of one rotor is aligned to face a south magnetic pole of the other rotor. Power means are included for rotating the rotors in unison with the electrically non-conductive support means and container being positioned between the rotors.

My copending application Serial No. 274,894 now Patent No. 3,187,151 pertains to an apparatus for heating a strip of electrically conductive material traveling in a predetermined path. The apparatus comprises a member in close spaced relationship to the strip, a plurality of permanent magnets arranged in a generally circular pattern with adjacent magnets having opposite polarity, means for securing the magnets onto the member, and means for rotating the member about an axis generally coinciding with the center of the pattern, the axis being through the plane of the moving strip. The permanent magnets on the member have low permeability, less than 19.0 and approaching 1.0, and high coercivity, i.e., above 750 oersteds. Such magnetic material is disclosed as isotropic or, preferably, anisotropic barium ferrite. When using anisotropic permanent magnet material, the preferred axis of magnetization is perpendicular to the heated strip and parallel to the rotational axis of the magnet supporting member.

In summary, my first-mentioned copending application pertains to the eddy current or hysteresis heating of a stationary electrically conductive container surrounded by a non-conductive, non-magnetic support means by two simultaneously rotated rotors each of which have spaced magnets thereon. My second-mentioned copending application pertains to the heating of a moving strip by a single rotor having permanent magnets of a given construction and being rotated adjacent the moving strip. In accordance with one aspect of the present invention, an elongated, electrically conductive article, such as disclosed in my second-mentioned copending application, is heated by a pair of synchronously rotated rotors somewhat similar in construction to the rotors shown and claimed in my first-mentioned copending application.

Referring to this particular aspect of the present invention, it is often desirable to heat a moving metal strip, such as a thin strip of aluminum or copper, so that the strip may be processed for any of a variety of purposes, such as, without limitation, to anneal the strip, to bake enamel or porcelain onto the strip, to flow tin-plate over the surface of the strip, or to dry a painted coating on the strip.

In the past, such moving metal strip was generally heated by radiating electric energy to the strip from juxtapositioned electrical resistance elements or by conducting heat energy to the strip with a heated gas. These prior systems generally used for heating the continuously moving strip were highly inefficient and required a substantial amount of capital investment. They also required a substantially long furnace for raising the temperature of the strip to the temperature desired for the particular process being carried out.

These and other disadvantages have been overcome by the present invention which is directed toward a magnetic device for generating eddy currents of hysteresis currents within the strip by passing the strip through a pair of synchronously rotated rotors, at least one of the rotors having magnets directing flux toward the other rotors.

In accordance with one aspect of the present invention, there is provided a device for heating an electrically conductive metal strip traveling in a given path comprising a first and second rotor, means for rotating the rotors about an axis generally perpendicular to the strip with the rotors being on opposite sides of the strip, one of the rotors having a plurality of circumferentially spaced, alternate north and south magnetic poles, means for synchronizing the speed of the rotors and flux directing means for causing the flux from the magnetic poles on the one rotor to extend to the other rotor and generally perpendicularly through the moving strip.

Other known attempts to utilize magnetic fields for heating a moving metal strip have not utilized permanent magnets formed from high coercivity, low permeability permanent magnets as described and claimed in my copending application Serial No. 168,616, filed January 25, 1962, or two synchronously rotating rotors of the type described in my copending application Serial No. 274,894, filed April 4, 1963, now Patent No. 3,187,151.

These past attempts to utilize magnetic fields for heating had another serious limitation. These devices generally used electro-magnets on a rotating disk or drum. The magnets on the rotating disks were subjected to extremely high temperatures during the heating of the moving strip. Consequently, the magnets on the disks were heated above their Curie point, which for some permanent magnet materials is approximately 450° C., so that the magnets lost their ferro-magnetic characteristics. In addition, the electro-coils surrounding the magnets were often destroyed by the extremely high temperature radiated or conducted from the moving strip being heated. In order to overcome this difficulty it has been suggested to increase the air gap between the heated strip and the rotating magnets; however, the magnetic field strength of the magnets is generally proportional to the square of the spacing between the strip and the magnets. Consequently, this increased spacing substantially limited the heating capacity of the rotating magnets. The resulting decrease in field strength with the increased air gap has been counteracted by increasing the speed of the rotating magnets or increasing the current flowing through the electro-coil surrounding the magnets. However, both of these measurements have proven unsuccessful since they were uneconomical and resulted in an extremely unwieldy mechanism.

In accordance with another aspect of the present invention the above-mentioned disadvantages of the prior magnet heating devices are completely overcome by providing a heating insulating layer between the strip and the magnets.

In accordance with this aspect of the present invention there is provided an apparatus for heating an elongated, electrically conductive article moving in a longitudinal direction. The apparatus, in accordance with the invention, comprises an electrically non-conductive, non-ferromagnetic channel surrounding the moving strip, a rotor, a plurality of magnets arranged in a generally circular pattern on the rotor adjacent magnets having opposite polarity, and means for rotating the rotor about an axis generally coinciding with the center of the pattern and with the axis being through the strip.

By providing such a channel, or protective layer around the moving strip, it is possible to use the apparatus for various heating purposes. For instance, the apparatus can be used for baking enamel or porcelain, for drying various coatings on the strip, and for heating or annealing the strip itself, to name only a few. Also, with such a channel it is possible to perform the heating operation under a special atmosphere within the channel since the channel may be easily sealed from the surrounding atmosphere.

In accordance with the preferred embodiment of the present invention the material forming the heat protective channel is a heat-resistant material which is electrically and magnetically non-conductive, such as ceramic material.

When heating a continuously moving metal strip for annealing or other purposes, especially when the heating operation takes place on a horizontal pass of the strip, it is necessary to support the strip in the furnace or heating zone at spaced intervals along its length. This is even more necessary when the strip is heated to a relatively high temperature because the heated strip has a substantially decreased tensile strength and a high longitudinal force cannot be applied to the strip itself to prevent sagging of the strip between supports located outside the heating zone.

In the past, to overcome this problem of supporting heated strip in the furnace or heating zone it was common practice to provide spaced rolls or guide bars within the heating zone and along the longitudinal pass of the moving strip; however, such structures proved extremely unsatisfactory because the rolls and the guide bars tended to mar the surface of the heated strip, especially if the strip was coated with a layer of paint or enamel, or the surface of the strip was highly polished. To alleviate this surface damage to the moving strip, it has been proposed that pressurized gas, such as air, be provided for supporting the moving strip in the furnace or heating zone. Although the pressurized gas formed a cushion that did solve the problem of surface damage to the moving strip, it was found that the cushion formed by the pressurized gas would tend to cool the moving strip. Accordingly, it was necessary to utilize a heated gaseous material when supporting the continuously moving strip during the heating operation. It has been found that the cost of heating the gaseous material substantially reduced the efficiency of the overall installation. In addition, if the heating operation on the strip raised the temperature of the strip to a very high level, the gaseous material, to prevent cooling of the strip, had to be heated to a relatively high temperature which would seriously damage the pumping equipment necessary for forming the gaseous cushion.

The present invention is directed toward a device for supporting the heated strip which overcomes the disadvantages concomitant with a gas cushion support and which still eliminates physical contact between the moving, heated strip and the internal furnace structure.

In accordance with this aspect of the present invention, there is provided a device for supporting an electrically conductive strip traveling in a generally horizontal path comprising a plurality of magnet units spaced longitudinally along the path of the strip and below the strip, each of the magnet units having at least one pair of opposite polarity magnet poles with the magnetic field between the poles extending upwardly and intersecting the strip at substantially right angles to the strip.

In accordance with a more limited aspect of the present invention, the magnet units as defined above for supporting the moving strip comprised a rotor, means for rotating the rotor below the strip and about an axis generally perpendicular to the strip, and the rotor has a plurality of circumferentially spaced, alternate polarity magnetic poles thereon.

The primary object of the present invention is the provision of an eddy current heating device for heating a continuously moving, elongated metal article which device is efficient in operation and easily constructed.

Another object of the present invention is the provision of an eddy current heating device for heating a continuously moving, elongated metal article which device utilizes two spaced rotors with at least one rotor having magnets arranged in a circular pattern, the alternate magnets having opposite magnetic polarity and means for rotating the rotors in unison about an axis extending through the article and generally concentric with the circular pattern of the magnet.

Still another object of the present invention is the provision of an eddy current heating device for a continuously moving, elongated metal article which device includes a rotating rotor with magnets thereon and a protective means for preventing heat destruction or deterioration of the magnets on the rotor.

Still a further object of the present invention is the provision of an eddy current heating device, as defined above, wherein the protective means includes a non-conductive, non-magnetic channel surrounding the moving article and placed between the magnet rotor and the heated article.

Still a further object of the present invention is the provision of a device for supporting an electrically conductive metal strip traveling in a generally horizontal path which device does not mar the surface of the moving strip.

Yet another object of the present invention is the provision of a device for supporting an electrically conductive metal strip which device induces eddy current flow within the strip which current flow causes a magnetic field that coacts with a magnetic field causing the eddy currents to support the strip with respect to the device.

These and other objects and advantages will become apparent from the following description used to illustrate the preferred embodiments of the invention as read in connection with the accompanying drawings in which:

FIGURE 1 is a schematic, cross-sectional, side elevational view illustrating the preferred embodiment of the present invention;

FIGURE 2 is a cross-sectional view taken generally along line 2—2 of FIGURE 1;

FIGURE 3 is a schematic, cross-sectional, side elevational view showing a modification of the preferred embodiment as shown in FIGURES 1 and 2;

FIGURE 5 is a schematic, cross-sectional, side elevational view showing an application of the preferred embodiment shown in FIGURES 1 and 2 with certain modifications;

FIGURE 6 is a cross-sectional view taken generally along line 6—6 of FIGURE 5;

FIGURE 7 is a wiring diagram illustrating, somewhat schematically, the magnetizing unit used in connection with the embodiment of the invention as shown in FIGURES 5 and 6;

FIGURE 10 is a schematic, cross-sectional, side elevational view illustrating another application of the present invention with a modification of the structure shown in FIGURE 8;

FIGURE 11 is a cross-sectional view taken generally along line 11—11 of FIGURE 10;

FIGURE 12 is a cross-sectional view taken generally along line 12—12 of FIGURE 10; and FIGURE 13 is a schematic, cross-sectional, side elevational view showing a further modification of the aspect of the invention shown in FIGURES 8–12.

Figure 8:
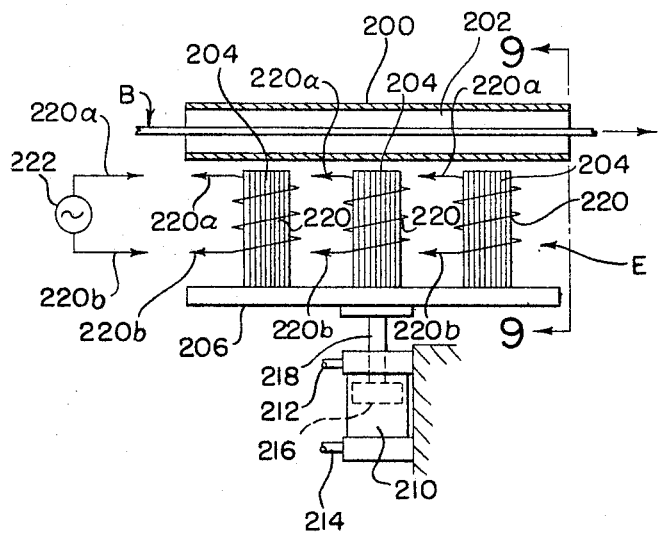
FIGURE 8 is a schematic, cross-sectional, side elevational view showing another aspect of the present invention.

Referring now to the drawings wherein the showings are for the purpose of illustrating preferred embodiments of the invention only, and not for the purpose of limiting same, FIGURES 1 and 2 show, somewhat schematically, an apparatus A for heating a longitudinally moving conductive strip B before it is coiled onto reel C. The apparatus A includes two rotors 10, 12 spaced from each other a distance $m$ and mounted in bearings 14, 16, respectively, for rotation about an axis $x$ extending generally perpendicularly through the strip B. In accordance with the illustrated embodiment of the present invention, the rotors 10, 12 are rotated by separate motors 20, 22 which are synchronized so that the rotors rotate in unison. It is within the contemplation of the present invention to provide means mechanically connecting the rotors 10, 12 so that they will be rotated in unison by motors 20, 22.

Each rotor 10, 12 is provided with a plurality of circumferentially positioned permanent magnets 24 with alternate magnets having opposite polarity as shown in FIGURE 2. The south magnetic pole (S) of a magnet on one rotor faces a north magnetic pole (N) of a magnet on the other rotor so that the fields between the rotors 10, 12 extend perpendicularly through the strip from a magnet on one rotor to a magnet on the other rotor. The adjacent magnets are spaced from each other a distance at least equal to the spacing between the rotors, represented by distance $m$, so that the flux lines tend to extend between the rotors instead of between the magnets on the same rotor. This causes a majority of the flux lines to extend through strip B for heating the strip.

In accordance with the embodiment of the present invention shown in FIGURE 1, the magnets 24 are formed from anisotropic barium ferrite which material has a preferred axis of magnetization perpendicular to the surface of the rotors 10, 12 so that the flux lines issuing from the magnets are concentrated in a perpendicular direction from the rotors. Also, such permanent magnet material is known to have high coercivity. This indicates that the individual magnets cannot be easily demagnetized by stray magnetic fields, and it also increases the flux lines which are available for heating the strip B. Another known characteristic of anisotropic barium ferrite is that such material has a low permeability so that the individual magnets do not tend to draw flux lines from adjacent magnets. The rotors 10, 12 are preferably formed from a high permeability material, such as soft iron; however, as described in my copending application Serial No. 168,616, filed January 25, 1962, now abandoned, the rotors may be provided with a high electrical conductive material surrounding the individual magnets. Such material may be aluminum or copper and it serves to prevent demagnetization fields from affecting the individual magnets.

An important aspect of the present invention as shown in FIGURES 1 and 2 is the provision of a heat protective channel 30 surrounding the strip B. It is known that most permanent magnets are adversely affected by subjecting them to relatively high temperatures. Consequently, as the strip B is heated, the radiant and conductive heat energy from the strip would tend to affect adversely the magnets 24 of rotors 10, 12. To prevent the heated strip from adversely affecting the operation of magnets 24, in accordance with the present invention, there is provided the protective channel 30 having the general contour of strip B and completely surrounding the strip in the location of the rotors 10, 12. The channel 30 is formed from a high resistivity, low heat conductivity, non-magnetic material, such as ceramic. The channel 30 forms a heat barrier between the heated strip B and the magnets on the rotors 10, 12.

In operation, the motors 20, 22 rotate rotors 10, 12 in unison so that the magnetic fields between the magnets 24 of the opposite rotors pass substantially perpendicularly through the strip B. As the magnetic flux lines caused by each separate pair of magnets 24 move through the strip B, eddy currents are created in the strip and these eddy currents tend to raise the temperature of the strip by $I^2R$ heating. The rotational speed of the rotors in relation to the linear speed of the strip B is selected so that the necessary increase in temperature is imparted to the moving strip B. The channel 30 prevents or limits heat from being radiated or conducted from the heated strip to the magnets 24.

Referring now more specifically to FIGURE 2, overheating of the edges of strip B is prevented by dimensioning the internal diameter $a$ of the circular pattern formed by magnets 24 so that it is substantially larger than the width $b$ of strip B. In this manner, the edges of the moving strip are not overheated to a great extent during the passing of the strip B through the apparatus A. In other words, the edges of the strip are not under the influence of the magnetic fields extending between the opposite magnets of rotors 10, 12 for an appreciably longer time than the central portion of the strip.

A modification of the embodiment shown in FIGURES 1 and 2 is illustrated in FIGURE 3 wherein apparatus 40 is utilized for heating strip B as it moves through the apparatus. In accordance with this embodiment of the invention, a rotor 42 rotated by shaft 42$a$ is provided with a plurality of circumferentially spaced magnets 44, similar to magnets 24 of rotors 10, 12. On the opposite side of the strip B there is provided a high permeability, ferromagnetic rotor 46 rotated by shaft 46$a$ which shaft is rotated at substantially the same speed as shaft 42a. Surrounding the strip B there is provided a heat protective channel 48, similar to channel 30 of FIGURES 1 and 2.

In operation of the embodiments shown in FIGURE 3, flux lines extend from the magnets 44 of rotor 42 to the high permeability, ferro-magnetic rotor 46. As the rotors 42, 46 are rotated in unison, these flux lines move through the strip B and generate eddy currents similar to the eddy currents described in connection with the operation of the embodiment shown in FIGURES 1 and 2. In this manner, heating of the strip B is accomplished. A variety of material can be used in the construction of rotor 46; however, in practice soft iron is generally used for this rotor.

Figure 4:
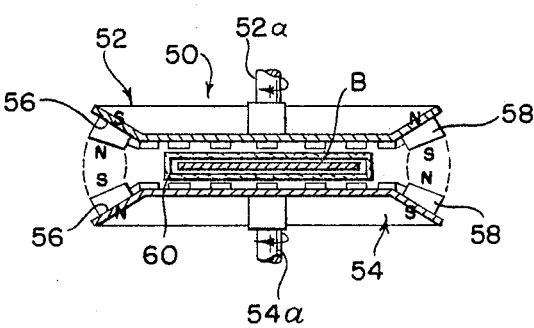
FIGURE 4 is a schematic, cross-sectional, end view showing a further modification of the preferred embodiment as shown in FIGURES 1 and 2.

When the rotors are rotated in unison, there is a tendency to heat the edges of the strip B to a greater extent than the central portion of the strip. This is due to the fact that the edge of the strip is under the influence of the magnetic fields for a longer period of time than the central portion of the strip. As described above, this effect can be limited by increasing the diameter of the magnet pattern on the rotors as shown in FIGURE 2. To further decrease the overheating effect of the magnets on the rotors can be somewhat canted, as shown in the embodiment of the invention in FIGURE 4. In this embodiment the apparatus 50 is provided with rotors 52, 54 rotated in unison by shafts 52a, 54a, respectively. The mounting flange 56 for supporting the individual magnets 58 is somewhat tapered outwardly from the strip B so that the flux lines adjacent the innermost edge of the magnets 58 travel through a shorter air gap than the flux lines adjacent the outermost edges of magnets 58. In this way, the edges of the strip B are under the influence of a strong magnetic field for a shorter time than when the magnets are parallel. Accordingly, the embodiment of the invention shown in FIGURE 4 attempts to alleviate the overheating of the edges of the strip. In apparatus 50, the strip B is isolated from the rotating rotors by a heat protective channel 60, similar in construction to channel 30 of apparatus A shown in FIGURES 1 and 2.

Another operating feature of the apparatuses shown in FIGURES 1-4 is that they cause the strip B to be suspended between the rotating rotors without the use of external physical supports, such as rollers or guide bars. When the eddy currents are induced into the conductive strip B, the eddy currents themselves generate a flux field which is similar in direction to the flux field caused by the magnets on the rotors. These like flux fields generate repelling forces that tend to move the strip B away from the rotors of the heating apparatus. These repelling forces, combined with the gravity force on the strip, suspend the strip B in the space between the rotors. Magnetic suspension of the strip B is advantageous when the strip has a surface susceptible to damage, or when the strip has been heated sufficiently to reduce its tensile strength below a value that will allow an increase of longitudinal forces to prevent sagging of the strip. This magnetic suspension of the strip B is an important aspect of the present invention and it will be hereinafter described in more detail.

Referring now to FIGURES 5 and 6, there is shown, in more detail, an apparatus for heating the moving strip B. This apparatus, designated as D, does not differ substantially from the embodiment of the invention shown in FIGURES 1 and 2; however, certain structural features are included which are not shown in the schematic representations of FIGURES 1 and 2. Apparatus D includes a lower magnetic rotor 80 and an upper magnetic rotor 82 which are somewhat identical in construction. For the purposes of simplicity, the structural features of the lower rotor 80 will be described in detail with the understanding that this description applies equally to the upper rotor 82.

The magnetic rotor 80 is driven by a drive means, not shown, through a drive shaft 84 journaled in bearing 86. In accordance with the illustrated embodiment of the invention, the drive shaft has an opening 88, for a purpose to be hereinafter described in detail, a radially extending flange 90 and an annular magnet support ring 92. Extending axially from the support ring there is provided a plurality of circumferentially spaced permanent magnets 94 supported by a ring 96 such as a soft iron ring, and braced by an outer support ring 98 to prevent centrifugal dislocation of the magnet during high speed rotation of the rotor 80.

The magnets 94 may take a variety of structural forms; however, in accordance with the preferred embodiment of the present invention, these magnets are formed from an anisotropic permanent magnet material, such as anisotropic barium ferrite or anisotropic Alnico. Anisotropic barium ferrite has a high coercivity which indicates that the permanent magnets cannot be easily de-magnetized by stray magnetic forces. Also, such permanent magnet material, as anisotropic barium ferrite, has a low permeability so that the magnets themselves do not tend to concentrate flux lines or draw flux lines from adjacent magnets. These characteristics of the permanent magnets, in accordance with the preferred embodiment of the present invention, are somewhat important in the operation of the heating device. It is appreciated that the magnets 94 may be electro-magnets having surrounding windings which generate a flux field when a current is applied thereto. Although this type of magnet could be used in the present invention, they are not preferred because the magnetizing coils require a continuous flow of current which decreases the efficiency of the overall heating operation and increases the size and cost of the magnet system itself.

The permanent magnets 94 of the spaced rotors 80, 82 are magnetized with appropriate polarity so that a south (S) magnetic pole of a magnet on one of the rotors faces a north (N) magnetic pole on the opposite rotor. Accordingly, a flux field is created between the facing magnets of the spaced rotors and a plurality of these flux fields are circumferentially spaced around the rotors. In accordance with the invention, the adjacent flux fields are passing in opposite directions between the rotors. As the rotors are rotated synchronously by a drive means, not shown, the flux fields move through the strip B to create eddy currents which eddy currents cause resistance heating of the strip B. The amount of heating is determined by the annular speed of the rotors, the linear speed of the strip, the flux density of the fields passing between the magnets and the spacing between the faces of opposite magnets. All of these variables can be utilized to change the amount of heating of the strip B; however, in accordance with the illustrated embodiment of the present invention, the amount of heating is changed by varying the flux density of the magnets 94, by changing the amount of magnetization of the permanent magnets 94 as hereinafter described.

Each magnet 94 is provided with a surrounding magnetizing coil 100, schematically shown in FIGURE 7, connected across leads 102, 104 which are in turn connected to slip rings 106, 108, respectively. The slip rings are supported on insulation sleeve 110 secured into the rotating shaft 84 of rotor 80. Brushes 112, 114 connect the leads 102, 104 with the output leads 116, 118 of condenser magnetizing unit 120. The unit 120 is adapted to direct high energy pulses of electricity into coils 100 which pulses have sufficient magnitude and polarity to either de-magnetize or magnetize the permanent magnets 94 a desired amount. Accordingly, to reduce the amount of heating of strip B, the unit 120 sends pulses of electrical energy through coil 100. These pulses have a predetermined magnetitude and polarity to de-magnetize partially the magnets 94 so that the flux fields passing between the magnets on the spaced rotors is decreased. This decrease in the density of the flux fields passing between the rotors causes a corresponding decrease in the amount of heating of strip B.

In a like manner, the heating of strip B is increased by changing the polarity of the pulses from condenser magnetizing unit 120 so that the pulses tend to magnetize the permanent magnets 94. It is appreciated that the maximum magnetization is accomplished when the magnets 94 are fully saturated and any further heating of the strip B must be accomplished by increasing the synchronous speed of the rotors, decreasing the speed of the strip B or decreasing the spacing between the magnets 94 of opposite rotors. The unit 120 may take a variety of structural embodiments without departing from the intended spirit and scope of the present invention. The magnetizing coils 100 have a relatively few number of turns so that the self-inductance of the coils are relatively low compared to the self-inductance of a coil utilized in an electro-magnet. In this manner the coils 100 will have a rapid change of current as the pulse is applied across the coil.

Referring now to FIGURE 7, there is illustrated a wiring diagram for the magnetizing circuit of magnets 94 as previously described. In addition, a switch 122 is shown for connecting the unit 120 across leads 116, 118 and a switch 124 for connecting a D.C. voltage source 126 across the same leads. The D.C. voltage source 126 is utilized to increase the flux density between spaced magnets 94 when the magnets have been fully magnetized by unit 120. In other words, the voltage source 126 is adapted to direct a continuous current through the coils 100 with such polarity to increase the flux between the spaced magnets after the magnets have been magnetized to saturation. This unit 126 is utilized to obtain the maximum heating of the strip B without changing the other heating variables mentioned above.

The spacing between adjacent magnets on rotor 80, represented as distance c in FIGURE 6, is preferably at least equal to the maximum distance between the rotors. By this construction, the flux lines from a magnet on one rotor tend to pass through the strip to a magnet of different polarity on the opposite rotor instead of passing from one magnet to the other on the same rotor. This increases the flux field density utilized in the heating operation. This feature is enhanced by providing low permeability magnets so that the adjacent magnets on one rotor do not tend to draw the flux lines from the surrounding magnets on the same rotor. By using anisotropic permanent magnet material for construction of magnets 94, the preferred axis may be set to extend between magnets on the opposite rotors so that the flux lines tend to extend between the rotors and not between adjacent magnets on one rotor.

As mentioned before in connection with the embodiments of the invention shown in FIGURES 1–4, the magnets are susceptible to damage by the heat generated within the strip B. To lessen the probability of damage to the magnets, the apparatus D is provided with a protective channel 130 having a longitudinally extending rectangular opening 131 and two spaced arcuate grooves 132, 133. These arcuate grooves form passages for the magnets 94 as they rotate in unison. The wall thickness of channel 130 is substantially decreased at the grooves 132, 133 so that the magnets 94 are positioned as close as possible to the moving strip B. By constructing the rotors 80, 82 with the axially extending rim 92 and the flange 90, the magnets may be located close to the strip B without requiring a decrease in the wall thickness of channel 130 except at the location of the moving magnets. In other words, the channel 130 which is formed from a non-conductive, heat resistant material such as ceramic, forms a physically large heat barrier except in the immediate vicinity of the magnets so that large amounts of heat are not radiated or conducted to the rotating magnets or their supporting structure.

In accordance with the illustrated embodiment of the present invention, the channel 130 is supported by longitudinally spaced hangers 134 extending between brackets 136 on the channel and a support structure 138. The hangers 134 are spaced from the rotating magnets 94 so that they are not appreciably affected by the magnetic lines extending between the rotors 80, 82.

The drive shafts 84 are provided with central openings 88, the upper one of which receives a hanger 140 which is connected onto a bracket 142 to support this bracket and, thus, the channel 130 in a manner similar to hangers 134. In opening 88 of the lower drive shaft there is provided a lower support 144 which is connected onto the bracket 142 and has an opening 156 for receiving leads 154 from thermocouples 150, 152. The leads 154 are adapted to be connected onto an appropriate control device which will automatically change the magnetization of magnets 94 when the heat of the strip B varies beyond predetermined limits. It is also possible to connect the lead 154 onto a visual indicator so that an operator can adjust the heating effect of the apparatus D in accordance with variations in the temperature of the strip B as evidenced by the indicator reading.

To maintain the magnets 94 at the lowest possible temperature, the interior surfaces of the flanges 90 are provided with air circulating vanes 160 which draw air through inlet orifices 162, spaced circumferentially around the shaft 84, and direct the air around the magnets 94 as indicated by the arrows in FIGURE 5.

The operation of the apparatus D in heating and supporting the strip B is not substantially different from the operation of the embodiments of the invention shown in FIGURES 1–4.

In the embodiments of the invention disclosed, only one set of rotors is disclosed; however, it is appreciated that a plurality of these rotor sets can be spaced longitudinally along the length of the moving strip B. These units may be staggered transversely or they may be centered with respect to the strip as shown in FIGURES 1–6. In accordance with a further modification of the present invention, the rotating axis of the spaced rotors can be placed at an angle so that the gap between the opposite, facing magnets increases and decreases as the rotors are rotated. This particular embodiment of the present invention allows greater heating in the area where the magnets come close together and lesser heating in the area where the magnets are further apart. Such an arrangement of the rotors is somewhat beneficial when heating an elongated, moving article that does not have a uniform cross-sectional area. The higher heating effect can be concentrated adjacent the greater cross-section of such an elongated article.

In accordance with still a further aspect of the invention, a pipe or tube traveling in a longitudinal direction can be heated by providing a number of magnet rotors spaced around the periphery of the pipe or tube. For instance, three rotors can be provided around the tube and rotating on axes angularly spaced 120° from each other. These are only a few of the modifications possible to adapt the present apparatus for a special heating application.

Referring now to another aspect of the structure shown in FIGURES 5 and 6, there is provided outside of the heating zone of apparatus D a plurality of magnet rotors 170, 172 and 174 which rotors are positioned within the circular recesses 175 on the under side of the protective channel 130. These magnet rotors are staggered transversely of the strip B and rotate in alternate angular directions as shown in FIGURE 6. Each rotor is somewhat identical and includes a plurality of circumferentially spaced permanent magnets 176, preferably formed from anisotropic barium ferrite. It is appreciated that other permanent magnet materials could be used or that appropriate electro-magnets could be positioned on the rotors 170, 172 and 174 without departing substantially from the intended spirit and scope of the present invention. Each of the rotors is provided with a ferromagnetic plate 178 below the permanent magnets 176 to direct the flux lines from the lower side of each magnet to the lower side of the immediately adjacent magnets. To prevent centrifugal dislodgment of the magnets 176, 176, the rotors are provided with a support ring 180 similar to ring 98 of the rotors 80, 82. At the lower end of each rotor there is provided a drive shaft 182 journaled within plain bearing 183 and connected to an appropriate drive means, such as motor 184. Immediately opposite the motor there is provided a dove-tail slot 186 adapted to slidably receive a dove-tail bracket 188 connected onto the motor so that the motor can be moved perpendicularly with respect to the plane of the strip B. To slide the motors 184, and thus the rotors 170, 172 and 174, perpendicularly along the slot 186, there is provided, in accordance with the illustrated embodiment of the present invention, a fluid operated cylinder 190 controlled by introducing fluid, such as air, into lines 192, 194 which reciprocates a piston 196 connected by a rod 198 to the motor.

In accordance with the structure as illustrated in FIGURES 5 and 6, the rotors 170, 172 and 174 are rotated below the strip B by motors 184, only one of which is shown. It is appreciated that a single motor could be connected to each rotor through an appropriate gearing arrangement with a mechanism for moving all of the rotors in unison perpendicularly with respect to the plane of the strip B without departing from the disclosure of this application. No matter how the rotors are rotated and reciprocated with respect to the strip B, the magnets on the rotating rotors induce eddy currents in the conductive strip B. These eddy currents generate a field having the same polarity as the fields created by the rotating rotors; therefore, the fields generated by the magnets on the rotors and the fields generated by the eddy currents tend to repel the strip perpendicularly with respect to the rotating axis of the lower rotors. This repelling tendency of the two fields maintains the strip suspended above the rotors.

The rotors 170, 172 and 174 also tend to produce a transverse movement in the strip B; however, by providing a plurality of oppositely rotating rotors, this transverse movement is prevented and the strip maintains a floating relationship over the rotating rotors. The rotational speed, field strength and spacing of the rotors prevents any appreciable heating of the strip by these rotors. If the heating of these rotors is at a detrimental level, gas can be forced around the strip so that the heat energy of the strip is dissipated. The channel 130 forms a heat barrier between the strip and the magnets 176 so that they will not be damaged by any heat within the strip B.

To adjust the floating position of the strip B over the rotors 170, 172 and 174, the rotors, individually or as a unit, can be moved perpendicularly to the plane of the strip by the fluid cylinder, or cylinders, 190. It is noticed that the support mechanism for the moving strip B is positioned outside the ceramic channel 130 so that there is no physical contact with the surface of the strip B. This prevents marring of the strip surface.

Another manner of adjusting the floating position of the strip B above the rotors is to provide coils, similar to coils 100 of apparatus D, for partially de-magnetizing the magnets 176 to lower the position of the strip B in the channel 130. Also, if electro-magnets are used on the rotors, the amount of current flowing in the magnetizing coils can be changed to adjust the level of the floating strip. The spacing between adjacent magnets 176 should be at least as great as the spacing between the magnets and the strip B at its maximum vertical height above the rotors so that a larger portion of the flux lines from the magnets extends through the strip and extend under the strip from one magnet to the other.

By using anisotropic permanent magnets for the magnets 176, the line of the flux fields between adjacent magnets will extend higher into the opening 131 than when isotropic magnet material is used because of the lesser tendency of the adjacent magnets to draw the flux lines from the surrounding magnets without allowing them to extend upwardly from the pole faces.

Figure 9:
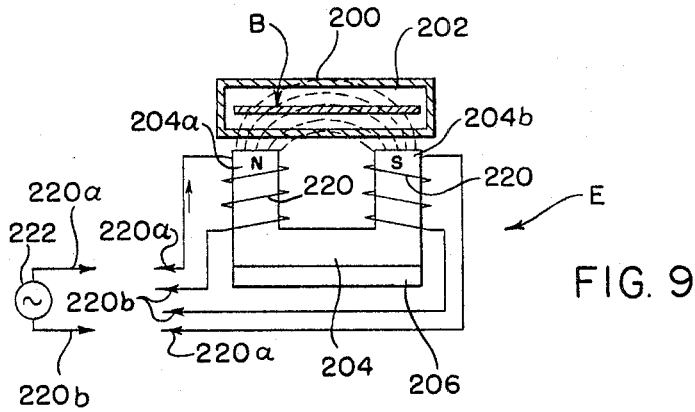
FIGURE 9 is a cross-sectional view taken generally along line 9—9 of FIGURE 8.

Referring now to FIGURES 8 and 9 there is illustrated a further embodiment of the invention wherein apparatus E is positioned below protective channel 200 having an opening 202 for receiving longitudinally moving strip B. The apparatus E supports the moving strip B within the opening and includes a plurality of longitudinally spaced U-shaped lamination cores 204 each having transversely spaced poles 204a and 204b, as shown in FIGURE 9. The cores are supported on movable plate 206 which is moved perpendicularly to the plane of strip B by a fluid operated cylinder 200 having control lines 212, 214 adapted to receive pressurized fluid, such as air, for reciprocating a piston 216 which is connected onto plate 206 by a rod 218. The laminations extend transversely of strip B and are used to direct flux lines from coils 220 surrounding the pole shoes 204a, 204b upwardly through the conductive, non-magnetic strip B as is best shown in FIGURE 9. Each of the coils 220 is provided with leads 220a, 220b connected to an appropriate source of alternating current such as the schematically represented generator 222. If high frequency is used, the cores 220 may be eliminated.

In operation, the transversely spaced pole shoes 204a, 204b are subjected to current in their respective coils 220 so that they have opposite polarities, as shown in FIGURE 9. The flux lines extending between the spaced pole shoes of each core 204 extend upwardly to intersect the moving strip B. The pole shoes alternate in polarity as the alternating current flows through the coils 220; therefore, eddy currents are generated within the strip B. These eddy currents cause magnetic fields which are of the same polarity of the magnetic fields extending between the pole shoes 204a, 204b and create a repelling force between the core 204 and the strip B. This repelling force allows the strip B to float along above the apparatus E. To adjust the vertical height of the floating strip E, the cores 204 are vertically adjusted by the cylinder 220.

Referring now to FIGURES 10–12, there is illustrated an apparatus F utilizing the present invention for coating the longitudinally moving strip B extending between two coils and supported adjacent the coils by support rolls 234, 236. This apparatus F includes a cabinet 238 having a spraying chamber 240 for spraying the coating onto the strip B, a heating chamber 242 for curing the coating and a cooling chamber 244 for reducing the temperature of the strip B before it reaches the support roll 236. The coating is sprayed onto the surfaces of the strip B by schematically represented spraying nozzles 246 within the spraying chamber 240. Thereafter, the strip passes into the heating chamber 242 where it is subjected to eddy current heating by schematically represented rotors 250, 252 and 254, which rotors not only heat the strip, but also maintain the strip in suspension within the protective channel 256. The rotors extend into recesses 258 of the channel 256. Immediately after the strip has been heated to a sufficient temperature to cure the coating sprayed thereon, the strip enters the cooling chamber having a plurality of magnet support rotors 260, 262, 264 and 266 below the strip and constructed in accordance with the previous discussion of this invention shown in FIGURES 5 and 6. It is possible to introduce a cooling gas into the cooling chamber 246 to allow rapid cooling of the strip after the sprayed coating has been cured by the heat generated in the strip within the heating chamber 242. The illustrated apparatus F shows the versatility of the present invention as defined in connection with FIGURES 1–9.

As so far described, the strip B was conductive and non-magnetic; however, if the strip B is ferro-magnetic and not heated above the Curie point, a slightly modified arrangement should be provided for suspending the moving strip. Such an apparatus is shown in FIGURE 13 and designated as apparatus G. This apparatus includes an outer cabinet 270, a heat protective channel 272 and a lower ferro-magnetic plate 274 extending along the path of the strip B'. Surrounding the channel, thus the strip and plate, there are a plurality of longitudinally spaced coils 276 having leads 276a, 276b. By introducing a direct current or an alternating current into the leads 276a, 276b from an appropriate power source, eddy currents are created within the ferro-magnetic strip B' and the ferro-magnetic plate 274 which eddy currents generate magnetic fields which are of like polarity. These like polarity fields create a repelling force between the strip B' and the plate 274. These repelling forces maintain the strip B' in suspension as it passes over the plate 274. Adjustment of the height of the strip within the channel 272 is accomplished by adjusting the current flow through the longitudinally spaced coils 276.

This invention has been described in connection with certain structural embodiments; however, it is to be appreciated that various structural changes may be made without departing from the intended spirit and scope of the present invention as defined in the appended claims.

Having thus described my invention, I claim:

1. A device for heating an electrically conductive strip traveling in a given path comprising vertically spaced first and second rotors, means for rotating said rotors about an axis generally perpendicular to said strip with the rotors being on opposite sides of said strip, one of said rotors having a plurality of circumferentially spaced, alternate north and south magnetic poles, means for synchronizing the speed of said rotors and flux directing means for causing the flux from the poles on said one rotor to extend to the other rotor and generally perpendicularly through said strip.

2. A heating device as defined in claim 1 wherein said flux directing means includes a high permeability, ferro-magnetic portion on said other rotor.

3. A heating device as defined in claim 1 wherein said flux directing means includes a plurality of circumferentially spaced, alternate north and south magnetic poles on said other rotor with the north pole of each rotor facing a south pole on the opposite rotor.

4. A heating device as defined in claim 1 wherein the spacing between adjacent magnetic poles on said rotor is at least as great as the spacing between said rotors.

5. A heating device as defined in claim 1 wherein said magnetic poles are created by permanent magnets mounted on said rotor, said permanent magnets being anisotropic with their preferred axis extending perpendicular to said strip and parallel to said axis.

6. A heating device as defined in claim 5 wherein said permanent magnets are provided with surrounding coils having a relatively few number of turns and a pulsing unit connected to said coils for applying electrical pulses of selected magnitude and polarity to selectively magnetize and de-magnetize said permanent magnets.

7. A heating device as defined in claim 5 wherein said permanent magnets are provided with surrounding coils, a source of D.C. electrical energy and means for selectively connecting said source to said coil for augmenting the magnetic fields created by said permanent magnets.

8. A heating device as defined in claim 5 wherein said permanent magnets have a coercivity and permeability on the order of the coercivity and permeability of barium ferrite.

9. A heating device as defined in claim 1, including a heat protective member between said magnetic poles and said strip.

10. A heating device as defined in claim 9 wherein said heat protective member is formed from ceramic material.

11. A heating device as defined in claim 9 wherein said heat protective member is a channel surrounding said strip.

12. A heating device as defined in claim 1 including means for adjusting the vertical spacing between said rotors.

13. A heating device as defined in claim 1 wherein at least said one rotor has air circulating vanes for directing air around said magnetic poles as said rotors are rotated.

14. An apparatus for heating an electrically conductive article, said apparatus comprising an electrically non-conductive, non-ferro-magnetic layer on at least one side of said article, a rotor, a plurality of magnets arranged in a generally circular pattern on said rotor with adjacent magnets having opposite polarity, and means for rotating said rotor about an axis generally coinciding with the center of said pattern, said axis being through said article, said layer being between said rotor and said article, said rotor including an axially extending rim for mounting said magnets, said layer having a clearance recess, and said magnets being rotatable in said recess.

15. An apparatus as defined in claim 14 wherein said recess includes two arcuate slots conforming to the path of movement of said magnets.

16. A method of supporting an electrically conductive elongated strip traveling longitudinally in a generally horizontal path, said method comprising rotating at least a pair of opposite polarity magnetic pole pieces immediately below said path and on an axis generally spaced from said pole pieces, parallel with the magnetization of said pole pieces and generally perpendicular to said path whereby current flow in said conductive strip generates magnetic fields opposing the fields created by said pole pieces.

17. An apparatus for heating an elongated, electrically conductive article moving in a longitudinal direction, said apparatus comprising an electrically non-conductive, non-ferro-magnetic channel surrounding said moving strip, a pair of rotors rotatably mounted on a given axis extending substantially perpendicular through said article, at least the first of said rotors having a plurality of magnets in a circular pattern with alternate magnets having opposite magnetic polarity, the second of said rotors being ferro-magnetic, said channel being between said rotors and said article, and means for rotating said rotors in unison.

18. An apparatus as defined in claim 17 wherein both of said rotors include a plurality of circumferentially spaced alternate polarity magnets with the magnets of each rotor facing an opposite polarity magnet on the other rotor.

19. A device for supporting an electrically conductive, ferro-magnetic, elongated article traveling longitudinally in a generally horizontal path, said device comprising a ferro-magnetic plate beneath said path, a plurality of coils surrounding said articles and said plate, said coils being spaced longitudinally along said path, and means for energizing said coils to create like magnetic repelling fields in said article and said plate.

20. A device as defined in claim 19 including a protective layer between said plate and said moving article.

21. A device as defined in claim 20 wherein said layer is ceramic.

22. A device for heating an electrically conductive elongated article traveling in a given path comprising a first and second rotor each rotatable about an axis, each of said rotors having a plurality of magnets positioned in a circular pattern concentric with the rotational axis of said rotor, the adjacent magnets of each rotor being of opposite polarity, said rotational axes intersecting each other at an angle and intersecting said article, means for mechanically coupling said rotors so that the magnets of one rotor are always opposite a different polarity magnet on the other rotor, and means for rotating said rotors in unison so that said opposite magnets successively increase and decrease their separating air gap.

23. A device for heating a generally circular cross-section, elongated article traveling in a given longitudinal path, comprising a plurality of heating units spaced around the periphery of said article, each of said units including a rotor mounted to rotate about an axis, a plurality of magnets circumferentially spaced around said rotor with adjacent magnets having opposite polarity, and said axes of said rotors being substantially normal to the surface of said article.

24. A device as defined in claim 23 wherein there is included three of said units and said axes of said units are located at 120° intervals around said article.

References Cited by the Examiner

UNITED STATES PATENTS

| | | | |
|---|---|---|---|
| 2,448,008 | 8/1948 | Baker | 219—10.61 |
| 2,448,010 | 8/1948 | Baker et al. | 219—10.61 |
| 2,448,012 | 8/1948 | Baker | 219—10.61 |
| 2,552,514 | 5/1951 | Bowlus | 219—8.5 X |
| 2,773,161 | 12/1956 | Baker | 219—10.77 |
| 2,902,572 | 9/1959 | Lackner et al. | 219—10.61 |
| 3,008,026 | 11/1961 | Kennedy | 219—10.61 |
| 3,058,840 | 10/1962 | Kerr et al. | 219—10.61 X |
| 3,187,151 | 6/1965 | Baermann | 219—10.61 |

FOREIGN PATENTS 263,774  10/1927  Great Britain.

ANTHONY BARTIS, *Acting Primary Examiner.*

RICHARD M. WOOD, *Examiner.*

L. H. BENDER, *Assistant Examiner.*